US012787144B2

(12) United States Patent
Reischer et al.

(10) Patent No.: US 12,787,144 B2
(45) Date of Patent: Nov. 3, 2026

(54) CIRCUIT ARRANGEMENT FOR IDENTIFYING THE BINNING-CLASS OF AT LEAST ONE LIGHT UNIT AND FOR CONTROLLING THE AT LEAST ONE LIGHT UNIT

(71) Applicant: ZKW Group GmbH, Wieselburg (AT)

(72) Inventors: Manuel Reischer, Hainfeld (AT); Günther Jernej, Graz (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/270,426

(22) Filed: Jul. 15, 2025

(65) Prior Publication Data

US 2026/0025897 A1 Jan. 22, 2026

(30) Foreign Application Priority Data

Jul. 22, 2024 (EP) .................................... 24190047

(51) Int. Cl.
*H05B 47/175* (2020.01)
*H05B 45/10* (2020.01)
*H05B 47/18* (2020.01)

(52) U.S. Cl.
CPC ................................ *H05B 47/1985* (2024.01)

(58) Field of Classification Search
None
See application file for complete search history.

(56) References Cited

U.S. PATENT DOCUMENTS

2023/0367733 A1 11/2023 Berlit et al.

FOREIGN PATENT DOCUMENTS

| | | | | |
|---|---|---|---|---|
| EP | 3689686 A1 | 8/2020 | | |
| WO | WO-2005096258 A1 * | 10/2005 | ........... | G09G 3/3406 |
| WO | WO-2009090601 A1 * | 7/2009 | ............. | H05B 47/18 |
| WO | WO-2018122067 A1 * | 7/2018 | ............. | H05B 45/14 |

OTHER PUBLICATIONS

WO-2018122067-A1 (Year: 2018).*
Extended European Search Report for EP Application 24190047, dated Dec. 12, 2024.

* cited by examiner

*Primary Examiner* — Anh Q Tran
(74) *Attorney, Agent, or Firm* — Eversheds Sutherland (US) LLP

(57) ABSTRACT

Circuit arrangement (1) for identifying the binning-class/es of at least one light unit (2) and for controlling the at least one light unit (2) in dependence of its binning class, wherein the circuit arrangement (1) comprises at least one micro-controller (6), and at least one light unit (2), the light unit (2) comprises at least one light module (3*a*, 3*b*), wherein each light module (3*a*, 3*b*) is classified by a binning class, said binning class representing radiation characteristics of its light sources (4), at least one light controller (5*a*, 5*b*), the microcontroller (6) being configured to select a specific operation mode (A, B, C, D, . . . ) and to configure the light controller (5*a*, 5*b*) accordingly to adjust the light emission radiated by the at least one light module (3*a*, 3*b*) in dependence of its binning class.

12 Claims, 3 Drawing Sheets

9

Figure 1:
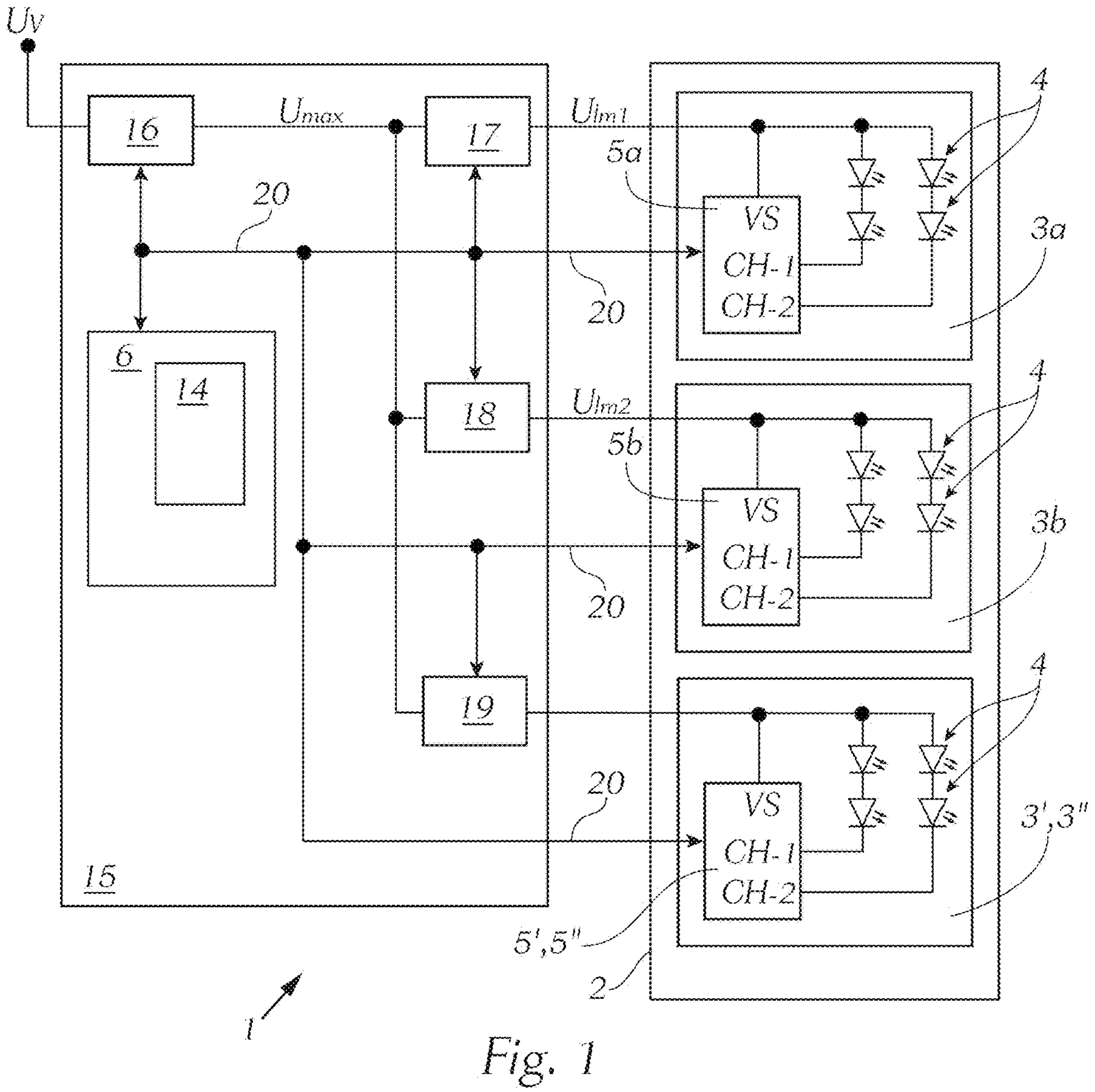

| addresses 11 of the address space 9 | light controller | indexation address 12 | non-indexation address 13 | binning class |
|---|---|---|---|---|
| 0000 | 5a | 00 | 0000 | A |
| 0001 | | 00 | 0001 | B |
| 0010 | | 00 | 0010 | C |
| 0011 | | 00 | 0011 | D |
| 0100 | 5b | 01 | 0100 | A |
| 0101 | | 01 | 0101 | B |
| 0110 | | 01 | 0110 | C |
| 0111 | | 01 | 0111 | D |
| 1000 | 5' | 10 | 1000 | A |
| 1001 | | 10 | 1001 | B |
| 1010 | | 10 | 1010 | C |
| 1011 | | 10 | 1011 | D |
| 1100 | 5" | 11 | 1100 | A |
| 1101 | | 11 | 1101 | B |
| 1110 | | 11 | 1110 | C |
| 1111 | | 11 | 1111 | D |

*Fig. 3a*

9

| Class / operation mode | A | B | C | ... | P |
|---|---|---|---|---|---|
| addresses 11 of the address space 9 | light controller | | | | |
| 0000 | 5a | - | - | | - |
| 0001 | - | 5a | - | | - |
| 0010 | - | - | 5a | | - |
| 0011 | - | - | - | | - |
| 0100 | - | - | - | | - |
| 0101 | - | - | - | | - |
| 0110 | - | - | - | | - |
| 0111 | - | - | - | | - |
| 1000 | - | - | - | | - |
| 1001 | - | - | - | | - |
| 1010 | - | - | - | | - |
| 1011 | - | - | - | | - |
| 1100 | - | - | - | | - |
| 1101 | - | - | - | | - |
| 1110 | - | - | - | | - |
| 1111 | - | - | - | | 5a |

*Fig. 3b*

| Class / operation mode | A | B | C | ... | xy |
|---|---|---|---|---|---|
| addresses 11 of the address space 9 | light controller | | | | |
| 0000 | 5a | 5a | - | | - |
| 0001 | 5b | - | 5a | | - |
| 0010 | - | 5b | 5b | | - |
| 0011 | - | - | - | | - |
| 0100 | - | - | - | | - |
| 0101 | - | - | - | | - |
| 0110 | - | - | - | | - |
| 0111 | - | - | - | | - |
| 1000 | - | - | - | | - |
| 1001 | - | - | - | | - |
| 1010 | - | - | - | | - |
| 1011 | - | - | - | | - |
| 1100 | - | - | - | | - |
| 1101 | - | - | - | | - |
| 1110 | - | - | - | | 5a |
| 1111 | - | - | - | | 5b |

*Fig. 3c*

| Class / operation mode | A | B | C | ... | P |
|---|---|---|---|---|---|
| addresses 11 of the address space 9 | light controller | | | | |
| 0000 | 5a | - | 5o | | 5b |
| 0001 | 5b | 5a | - | | 5c |
| 0010 | 5c | 5b | 5a | | 5d |
| 0011 | 5d | 5c | 5b | | 5e |
| 0100 | 5e | 5d | 5c | | 5f |
| 0101 | 5f | 5e | 5d | | 5g |
| 0110 | 5g | 5f | 5e | | 5h |
| 0111 | 5h | 5g | 5f | | 5i |
| 1000 | 5i | 5h | 5g | | 5j |
| 1001 | 5j | 5i | 5h | | 5k |
| 1010 | 5k | 5j | 5i | | 5l |
| 1011 | 5l | 5k | 5j | | 5m |
| 1100 | 5m | 5l | 5k | | 5n |
| 1101 | 5n | 5m | 5l | | 5o |
| 1110 | 5o | 5n | 5m | | - |
| 1111 | - | 5o | 5n | | 5a |

*Fig. 3d*

CIRCUIT ARRANGEMENT FOR IDENTIFYING THE BINNING-CLASS OF AT LEAST ONE LIGHT UNIT AND FOR CONTROLLING THE AT LEAST ONE LIGHT UNIT

The invention relates to a circuit arrangement for identifying the binning-class/es of at least one light unit and for controlling the at least one light unit in dependence of its binning class, wherein the circuit arrangement comprises at least one microcontroller, and at least one light unit, wherein the light unit comprises at least one light module comprising at least one light source, wherein each light module is classified by a binning class, said binning class representing radiation characteristics of its light sources, at least one light controller, said at least one light controller being connected to the at least one microcontroller and to the at least one light module, the microcontroller being configured to select a specific operation mode and to configure the light controller accordingly to adjust the light emission radiated by the at least one light module in dependence of its binning class, wherein the at least one light controller comprises an indexation interface having a resolution of n bits, wherein the resolution of the indexation interface is identical for each light controller or digitally replaced by the lowest resolution of all the light controllers, wherein n is a natural number and defining an address space with a total number of $2^n$ addresses, each address being represented by a bit combination of at least some of the n bits of the address space, wherein the at least one light controller is designated with at least a number of m addresses, said designated address being referred to as indexation address.

From a perspective of a hardware designer, it has to be mentioned that light modules usually contain light sources, in particular LEDs, of a certain binning class. Light controllers (for instance LED-Drivers/LED-Matrix-Manager) to drive the light-sources control these light sources in accordance to their binning class, said binning class representing the efficiency of a light source. That means that light sources of the identical binning class should irradiate light with the same intensity when powered with the same level of power. The binning class can vary, for instance depending on the purity of the substrate of the light sources. Usually, the binning class of the light sources of a light module within is the same for all the light sources of a light module.

For the purpose of economic efficiency it can be a requirement that light modules having different binning classes are suitable to be used within a single circuit arrangement. This can be due to cost reasons but also to enhance the compatibility with various products reducing the logistical dependence of light sources having a certain classification.

It is an object of the invention to overcome the drawbacks outlined above. This object is achieved by a circuit arrangement of the above-mentioned kind, wherein the number of indexation addresses m that are solely designated to at least one light controller is lower than the total number of addresses of the address space leaving at least one address at least partially unrelated to the designation of a light controller, and wherein $0 \leq m < 2^n$, wherein said at least one at least partially unrelated address being referred to as non-indexation address, wherein the at least one microcontroller is configured to read the indexation interface of each light controller, to identify the at least one non-indexation address, to compare the non-indexation addresses with a predetermined lookup table, and to determine—based on the result of said comparison—the operation mode of the at least one light controller.

The present invention allows cost efficient recognition of the binning class of light modules and light units. The circuit arrangement can be free of additional pins and/or connectors that are by default designed for detection of binning classes. In contrast, the invention uses the existing address interface (in particular the address pins) for providing information regarding binning classes.

Of course, the light source can be an LED-light source. The term "lowest resolution of all light controllers" refers to the light controller having the lowest address resolution of all the light controllers. Of course, two or more light units can be part of the circuit arrangement according to the present invention. The binning classes of the light modules can be identical within a light unit, and/or they can also be identical for two or more light units. However, it is also possible that the binning classes between light units vary or that the binning classes of light modules associated with a light unit vary.

The number of indexation addresses can be zero. This can be useful if the circuit arrangement comprises only light modules of the same binning class being controlled by only one light controller. In this case, if the indexation interface has a resolution of 4 bits, 16 different binning classes can be associated with a light module depending on its selected indexation address.

Moreover, it is also possible to differentiate between indexation addresses that cover all the n bits and are solely used for the purpose of indexation and alternatives, wherein the indexation address does not cover all the n bits and is therefore contained in bit combination representing a non-indexation address and therefore not solely used for indexation.

The number of light controllers and the number of light modules can be greater than one, and wherein each light controller controls at least one light module. Each light module is associated with a light controller. However, light modules of the same binning class can be associated with the same light controller.

Advantageously, the number of indexation addresses is at least two. If they control light modules having potentially different binning classes, at least two distinct indexation addresses are required.

It is possible that the number of bits associated with indexation addresses is lower than the total number of n bits, and wherein each address contains information regarding an indexation address and a non-indexation address.

It is possible that each of the total number of addresses has n bits and is either solely used as an indexation address or as a non-indexation address. This means there is no address that contains both information regarding the binning class and the indexation. The addresses are exclusively used either for indexation or for determination of the binning class.

It is possible that the total number of indexation addresses is greater than $2^{n-1}$ and therefore the number of indexation addresses m that are solely designated to at least one light controller is zero. This means that m=0 and implies that there is no bit of the n bits of the indexation interface that is solely used determining a non-indexation address.

It is possible that the number of indexation addresses is equal or less than $2^{n-1}$ and wherein at least one bit of the n bits of the indexation interface exists that is solely used to determine a non-indexation address (i.e. $m \geq 1$).

It is possible that the at least one microcontroller determines for each light controller its operation mode individually and independently based on the bits that are solely dedicated to determine non-indexation addresses.

It is possible that n equals one.

It is possible that n equals 2, 3, 4 or a higher number.

It is possible that only information received via the indexation interface is used to determine binning classes of light modules. This means that the circuit arrangement is—apart from the indexation interface—free of pins and/or interfaces that are by default designed for detection of binning classes.

The microcontroller can have for instance SPI or UART-bus communication line to communicate with light controllers.

The lookup table can be stored on a memory that is accessible by the microcontroller. The lookup table can be programmed, downloaded, it can be provided by factory or service staff, etc.

Figure 2:
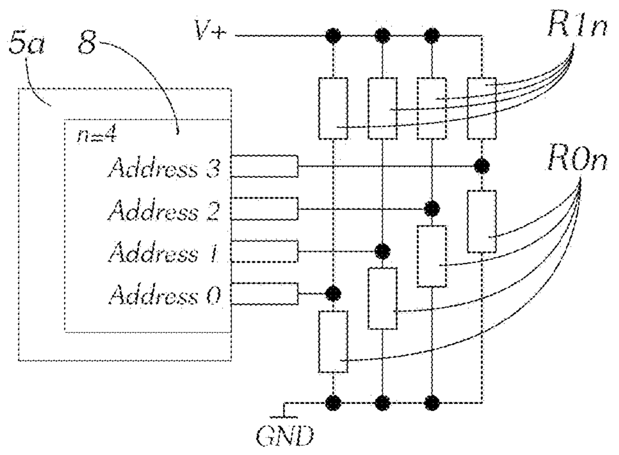

In the following, in order to further demonstrate the present invention, illustrative and non-restrictive embodiments are discussed, as shown in the drawings, which show:

FIG. 1 an exemplary schematic of a circuit arrangement according to the invention, FIG. 2 an exemplary schematic of a light controller to be used in the present invention, FIG. 3*a* to FIG. 3*d* various examples of lookup tables.

In the following figures identical reference signs refer to identical features unless expressly depicted otherwise. The reference signs are only for informational purpose and do not delimit the scope of protection.

FIG. 1 shows a circuit arrangement 1 for identifying the binning-class/es of at least one light unit 2 and for controlling the at least one light unit 2 in dependence of its binning class/es. The circuit arrangement 1 comprises at least one microcontroller 6, and at least one light unit 2. The light unit 2 comprises at least one light module 3*a*, 3*b* comprising at least one light source 4, wherein each light module 3*a*, 3*b* is classified by a binning class, said binning class representing radiation characteristics of its light sources 4. Moreover, the light unit 2 comprises at least one light controller 5*a*, 5*b*. Each light controller 5*a* and 5*b* is connected to the at least one microcontroller 6 and to at least one light module 3*a*, 3*b*. The microcontroller 6 is configured to select a specific operation mode A, B, C, D . . . matching a corresponding binning class of the respective light module 3*a*, 3*b*, 3*c*. Then, the respective light controller 5*a*, 5*b* is configured accordingly to adjust the light emission radiated by the at least one light module 3*a*, 3*b* in dependence of its binning class. In case of a binning class having a lower efficiency the light controller 5*a*, 5*b* can compensate this aspect by increasing the operational power provided to the light sources.

The at least one light controller 5*a*, 5*b* comprises an indexation interface 8 having a resolution of n bits (FIG. 2 shows an example wherein n=4). The resolution of the indexation interface 8 is identical for each light controller 5*a*, 5*b* or digitally replaced by the lowest resolution of all the light controllers 5*a*, 5*b*, wherein n is a natural number and defining an address space 9 with a total number of $2^n$ addresses 11. As can be seen from the tables of FIG. 3*a* to FIG. 3*d*, each address 11 being represented by a bit combination of at least some of the n bits of the address space 9. The at least one light controller 5*a*, 5*b* is designated with at least a number of m addresses 11, said designated address being referred to as indexation address 12.

FIG. 1 provides details of an exemplary setup of hardware comprising a power input that is provided with the voltage Uv, energy converters (namely boost and buck converters) transforming the voltage Uv towards Umax and down to Ulm1, Ulm2 etc. Of course, this hardware arrangement is only exemplary and the person skilled in the art can design different arrangements. References 3' and 3" indicate various additional light modules.

Taking a closer look at FIG. 3*a*, a first example of a potential lookup table 14 is disclosed. Therein, the number of bits n is four creating a total address space 9 of sixteen addresses 11. In the present example, two out of the four bits are used to index a light controller. Therefore, four different light controllers 5*a*, 5*b*, 5' and 5" (not shown in the figures) can be addressed using two bits. In this example, the two bits having the highest significance are used to address the controllers. Of course, it is also possible to use any other bit. The binning class is then represented by the lower bits, namely the least significant bit and the bit of the next higher order. Therefore, the address "0001" would indicate that the light controller having the indexation address 12 "00" has the binning class associated with "01". This binning class would be represented by the letter B. In the present example, all the light controllers have the binning class "A" ("00") but by changing the lower two bits it is possible to change the binning class to either "B" ("01"), "C" ("10") or "D" ("11"). This method allows to set the binning class of each light controller independently of the remaining light controllers.

The lookup table according to FIG. 3*a* implies the following technical specifications:

| | |
|---|---|
| number of bits n | 4 |
| total number of addresses 11 with n bits | 16 |
| total number m of indexation addresses 12 | 4 |
| number of bits solely associated with indexation addresses 12 | 2 |
| number of addresses solely for indexing with n-bits | 0 |
| total number of non-indexation addresses 13 | 16 |
| number of separate addressable light controllers | 4 |
| number of possible binning classifications | 4 |

This table clearly shows that the number of indexation addresses 12 that are solely designated to at least one light controller 5*a* or 5*b* (2 bits but none of the full four bit addresses, i.e. no address is solely designated to a light controller) is lower than the total number of addresses 11 of the address space 9 leaving at least one address 11 at least partially unrelated to the designation of a light controller 5*a*, 5*b*, and wherein $0 \leq m < 2^n$, wherein said at least one at least partially unrelated address being referred to as non-indexation address 13, wherein the at least one microcontroller 6 is configured to read the indexation interface 8 of each light controller 5*a*, 5*b*, to identify the at least one non-indexation address 13, to compare the non-indexation addresses 13 with a predetermined lookup table 14, and to determine—based on the result of said comparison—the operation mode A, B, C, D, . . . of the at least one light controller 5*a*, 5*b*.

If there is only one single light module, it is not necessary to devote any address to the respective light controller. In this case, the number of indexation addresses 12 can be zero.

By alternative, FIGS. 3*b* to 3*d* disclose a method wherein indexation addresses 12 exist that are solely devoted to the purpose of indexing a light controller. However, there is no bit of the address space that is solely used for this purpose. The remaining addresses can be used to identify binning classes. FIG. 3*b* shows an example wherein only one address is used to index a light controller 5*a*. Of course, it is possible to index more than only one light controller 5*a* with the same address in parallel creating a light controller group 5*a*. However, in this case, the controllers cannot be determined independently. For the sake of easier explanation, in the following it is assumed that there is only a single light controller 5*a*. A lookup table could simply match the addresses 11 with certain binning classes. If—for instance—the light controller Sa is detected with the address “0000”, and the remaining addresses are free, the class “A” could apply, if the light controller Sa is detected with the address “0001”, and the remaining addresses are free the class “B” could apply, etc. In this example, none of the four bits are solely associated with the indexing of a light controller. On the contrary, a full n (=4) bit address is used to determine the binning class.

The lookup table according to FIG. 3*b* implies the following technical specifications:

| | |
|---|---|
| number of bits n | 4 |
| total number of addresses 11 with n bits | 16 |
| total number m of indexation addresses 12 | 1 |
| number of bits solely associated with indexation addresses | 0 |
| number of addresses solely for indexing with n-bits | 1 |
| total number of non-indexation addresses 13 | 15 |
| number of separate addressable light controllers | 1 |
| number of possible binning classifications | 16 |

FIG. 3*c* follows the same pattern as FIG. 3*b*, however, in this case two light controllers 5*a* and 5*b* are addressed. Assuming that the light controllers 5*a* and 5*b* do have identical binning class, it is possible to separate between a plurality of binning classes depending on the addresses of both light controllers 5*a* and 5*b*. If the addresses “0000” and “0001” are indexation addresses and fourteen non-indexation addresses are remaining, the binning classes can be determined as “A”. In case that the addresses “0000” and “0010” are indexation addresses (which can be noticed based on the fact that the light controllers 5*a* and 5*b* react under these addresses), the class can be determined as “B”, etc.

The lookup table according to FIG. 3*c* implies the following technical specifications:

| | |
|---|---|
| number of bits n | 4 |
| total number of addresses 11 with n bits | 16 |
| total number m of indexation addresses 12 | 2 |
| number of bits solely associated with indexation addresses | 0 |
| number of addresses solely for indexing with n-bits | 2 |
| total number of non-indexation addresses 13 | 14 |
| number of separate addressable light controllers | 2 |
| number of possible binning classifications | >>16 |

FIG. 3*d* follows the same pattern as FIGS. 3*b* and 3*c*, however, in this case fifteen light controllers 5*a* to 5*o* are addressed. If the light controllers 5*a* to 5*o* do have identical binning classes, it is possible to separate between a plurality of binning classes depending on the addresses of the controllers 5*a* and 5*b* or the remaining non-indexation addresses 13, in particular, if the event that the controller 5*a* to 5*o* do have a specific signature that can be recognized by the microcontroller 6. In this case, it is possible to derive information from the fact that the addresses 11 of the total address space 9 are associated with the light controllers 5*a* to 5*o* in a specific order. For instance, while the address “1111” could remain as a non-indexation address 13, the situation in which the controller Sa is associated with the address “0000” could be compared with a different situation wherein the controller 5*a* is associated with the address “0001” and the address “0000” is associated with controller 5*b* or 5*c* or any other controller. If the controllers 5*a* to 5*o* can be distinguished, it is possible to derive information from all these permutations and therefore to increase the volume of information that can be associated with each configuration.

The lookup table according to FIG. 3*d* implies the following technical specifications:

| | |
|---|---|
| number of bits n | 4 |
| total number of addresses 11 with n bits | 16 |
| total number m of indexation addresses 12 | 15 |
| number of bits solely associated with indexation addresses | 0 |
| number of addresses solely for indexing with n-bits | 15 |
| total number of non-indexation addresses 13 | 1 |
| number of separate addressable light controllers | 15 |
| number of possible binning classifications | 16 |

In other words, in FIG. 3*a*, for example, the first two bits of the total of 4 bits are used for indexing the light controllers. This means that-when referring the four-digit bit combination as a (total) address 11—it is actually sufficient to check the first two bits and the actual total address, which comprises four bits, therefore contains other information. The degree of freedom for non-indexation purposes amounts to two bits. In this case, the total address itself therefore contains a total of 4 bits, of which 2 bits are used exclusively for addressing and 2 “free” bits. Therefore, in the example of FIG. 1*a* it is possible to address four controllers with four brightness classes. Due to the degrees of freedom of the last 2 bits, within the diction of this application such addresses are referred to as being at least partially “unrelated” to the designation of a controller. This means that the selection of the address has already encoded additional information next to the indexation of the controller.

In contrast to this variant, scenarios of FIGS. 3*b* to 3*d* show no individual selected bits that are used exclusively for addressing. Instead, there are simply total addresses (comprising 4 bits), whereby a division into brightness classes can be made depending on the total address under which controllers react, or—complementarily—which addresses remain free. In these examples, it is usually not sufficient to check only a few of the bits of the total address. On the contrary, all the bits of the address space are usually checked before associating to a specific controller.

As can be understood from these examples, it is also possible to differentiate between indexation addresses that cover all the n bits and are solely used for the purpose of indexation (see FIG. 3*b* to FIG. 3*d*) and alternatives, wherein the indexation address does not cover all the n bits and is therefore contained in bit combination representing a non-indexation address and therefore not solely used for indexation (see FIG. 3*a*).

It is possible that the number of light controllers 5*a*, 5*b* and the number of light modules 3*a*, 3*b* is greater than one, and wherein each light controller 5*a*, 5*b* controls at least one light module 3*a*, 3*b*.

When the number of indexation addresses is at least two, it can be preferable that the number of bits associated with indexation addresses 12 is lower than the total number of n bits, and wherein each address 11 contains information regarding an indexation address 12 and a non-indexation address 13.

It is possible that each of the total number of addresses 11 has n bits and is either solely used as an indexation address 12 or as a non-indexation address 13.

By alternative, it is possible that the total number of indexation addresses 12 is greater than $2^{n-1}$ and therefore the number of indexation addresses 12 *m* that are solely designated to at least one light controller 5*a*, 5*b* is zero.

Also, it is possible that the number of indexation addresses 12 is equal or less than $2^{n-1}$ and wherein at least one bit of the n bits of the indexation interface 8 exists that is solely used to determine a non-indexation address 13. In particular, the at least one microcontroller 6 can determine for each light controller 5a, 5b its operation mode A, B, C, D, . . . individually and independently based on the bits that are solely dedicated to determine non-indexation addresses.

As can be seen from the present examples, only information received via the indexation interface 8 is used to determine binning classes of light modules 3a, 3b.

The invention is not limited to the embodiments shown but is defined by the entire scope of protection of the claims. Individual aspects of the invention or of the embodiments can also be taken up and combined with one another. Any reference signs in the claims are exemplary and serve only the purpose to allow easier review without restricting the claims.

The invention claimed is:

1. Circuit arrangement (1) for identifying the binning-class/es of at least one light unit (2) and for controlling the at least one light unit (2) in dependence of its binning class/es, wherein the circuit arrangement (1) comprises at least one microcontroller (6), and at least one light unit (2), wherein the light unit (2) comprises at least one light module (3a, 3b) comprising at least one light source (4), wherein each light module (3a, 3b) is classified by a binning class, said binning class representing radiation characteristics of its light sources (4), at least one light controller (5a, 5b), said at least one light controller (5a, 5b) being connected to the at least one microcontroller (6) and to the at least one light module (3a, 3b), the microcontroller (6) being configured to select a specific operation mode (A, B, C, D, . . . ) and to configure the light controller (5a, 5b) accordingly to adjust the light emission radiated by the at least one light module (3a, 3b) in dependence of its binning class, wherein the at least one light controller (5a, 5b) comprises an indexation interface (8) having a resolution of n bits, wherein the resolution of the indexation interface (8) is identical for each light controller (5a, 5b) or digitally replaced by the lowest resolution of all the light controllers (5a, 5b), wherein n is a natural number and defining an address space (9) with a total number of $2^n$ addresses (11), each address (11) being represented by a bit combination of at least some of the n bits of the address space (9), wherein the at least one light controller (5a, 5b) is designated with at least a number of m addresses (11), said designated address being referred to as indexation address (12), characterized in that the number of indexation addresses (12) m that are solely designated to at least one light controller (5a, 5b) is lower than the total number of addresses (11) of the address space (9) leaving at least one address (11) at least partially unrelated to the designation of a light controller (5a, 5b), and wherein $0 \leq m < 2^n$, wherein said at least one at least partially unrelated address being referred to as non-indexation address (13), wherein the at least one microcontroller (6) is configured to read the indexation interface (8) of each light controller (5a, 5b), to identify the at least one non-indexation address (13), to compare the non-indexation addresses (13) with a predetermined lookup table (14), and to determine—based on the result of said comparison—the operation mode (A, B, C, D, . . . ) of the at least one light controller (5a, 5b).

2. Circuit arrangement (1) according to claim 1, wherein the number of indexation addresses (12) is zero.

3. Circuit arrangement (1) according to claim 1, wherein the number of light controllers (5a, 5b) and the number of light modules (3a, 3b) is greater than one, and wherein each light controller (5a, 5b) controls at least one light module (3a, 3b).

4. Circuit arrangement (1) according to claim 3, wherein the number of indexation addresses ( ) is at least two.

5. Circuit arrangement (1) according to claim 4, wherein the number of bits associated with indexation addresses (12) is lower than the total number of n bits, and wherein each address (11) contains information regarding an indexation address (12) and a non-indexation address (13).

6. Circuit arrangement (1) according to claim 1, wherein each of the total number of addresses (11) has n bits and is either solely used as an indexation address (12) or as a non-indexation address (13).

7. Circuit arrangement (1) according to claim 1, wherein the total number of indexation addresses (12) is greater than $2^{n-1}$ and therefore the number of indexation addresses (12) m that are solely designated to at least one light controller (5a, 5b) is zero.

8. Circuit arrangement ( ) according to claim 1, wherein the number of indexation addresses (12) is equal or less than $2^{n-1}$ and wherein at least one bit of the n bits of the indexation interface (8) exists that is solely used to determine a non-indexation address (13).

9. Circuit arrangement (1) according to claim 8, wherein the at least one microcontroller (6) determines for each light controller (5a, 5b) its operation mode (A, B, C, D, . . . ) individually and independently based on the bits that are solely dedicated to determine non-indexation addresses.

10. Circuit arrangement (1) according to claim 1, wherein n equals one.

11. Circuit arrangement (1) according to claim 1, wherein n equals 2, 3, 4 or a higher number.

12. Circuit arrangements (1) according to claim 1, wherein only information received via the indexation interface (8) is used to determine binning classes of light modules (3a, 3b).

* * * * *